United States Patent [19]

Berger

[11] 4,348,761

[45] Sep. 7, 1982

[54] PORTABLE FIELD TEST UNIT FOR COMPUTER DATA AND PROGRAM STORAGE DISC DRIVE

[75] Inventor: James K. Berger, Malibu, Calif.

[73] Assignee: Pioneer Research, Inc., Santa Monica, Calif.

[21] Appl. No.: 184,811

[22] Filed: Sep. 8, 1980

[51] Int. Cl.³ .............................................. G06F 11/22
[52] U.S. Cl. ....................................... 371/21; 364/200
[58] Field of Search ................... 371/21; 364/200, 900

[56] References Cited

U.S. PATENT DOCUMENTS 4,126,898  11/1978  Spangler et al. .................... 364/900
4,268,905   5/1981  Johann et al. ....................... 364/200

*Primary Examiner*—David H. Malzahn
*Attorney, Agent, or Firm*—Keith D. Beecher

[57] ABSTRACT

A portable, programmable, microprocessor-controlled, universal field test unit is provided which is capable of performing functional tests on most, if not all, of the better known present-day disc drives, including the 80, 160 and 300 megabyte types. The unit to be described will be termed herein as a programmable disc drive qualifier, and it is capable of carrying out a wide variety of special test programs, as well as standard diagnostic programs, and it may also be used to format disc packs with many different formats, including thirty-two and eighty-six sector formats. The qualifier may be internally set to count all data errors, or only uncorrectable errors. The qualifier, in the embodiment to be described, is controlled by a combination of twelve operation keys and twelve numeric keys. A complete instruction is generated by the actuation of one of the operation keys and one of the numeric keys. Individual instructions may be executed in the unit, or it may be run automatically under program control. Programs may be created by the actuation of the operation keys and numeric keys, or they may originate from a pre-programmed memory.

10 Claims, 9 Drawing Figures

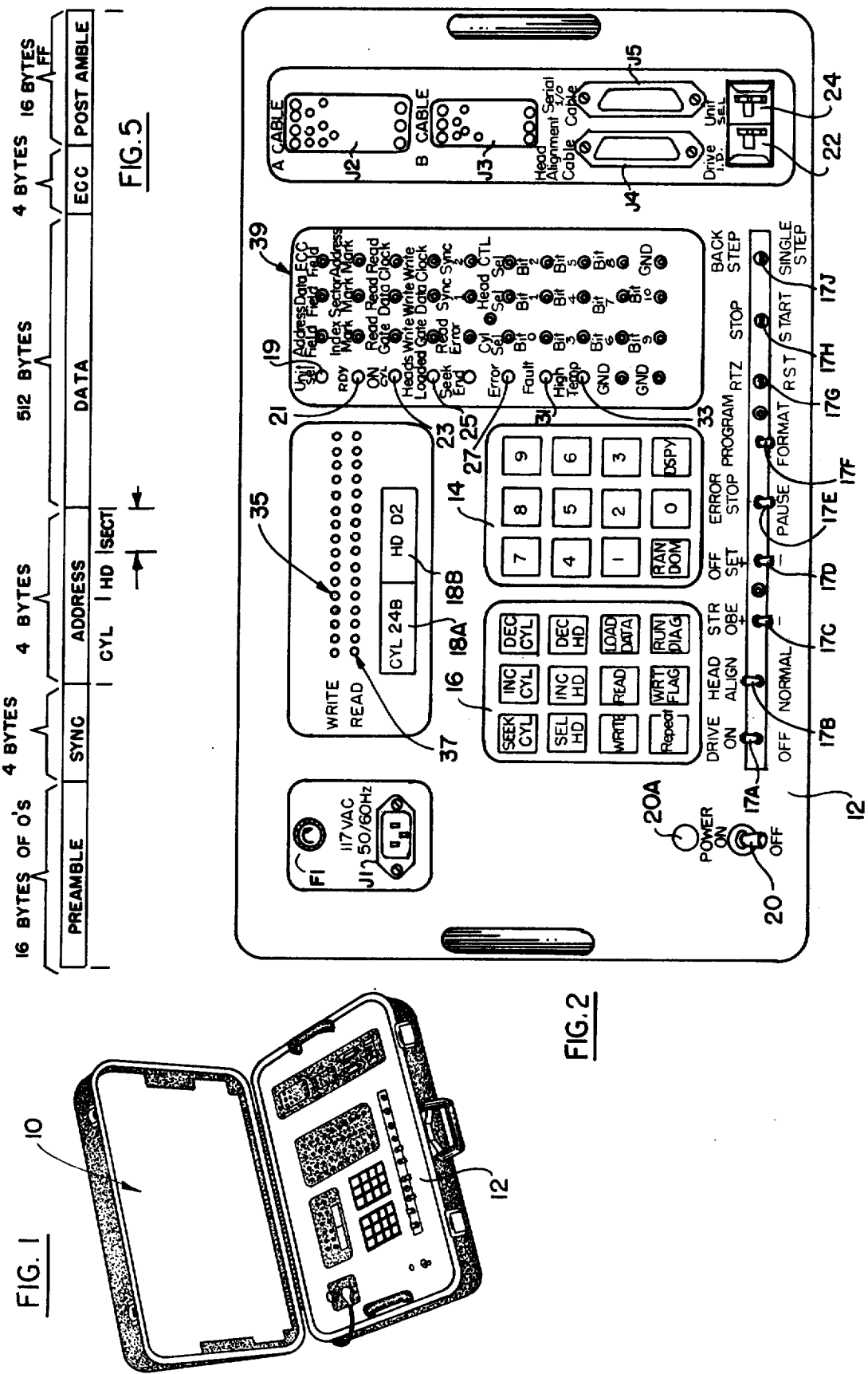

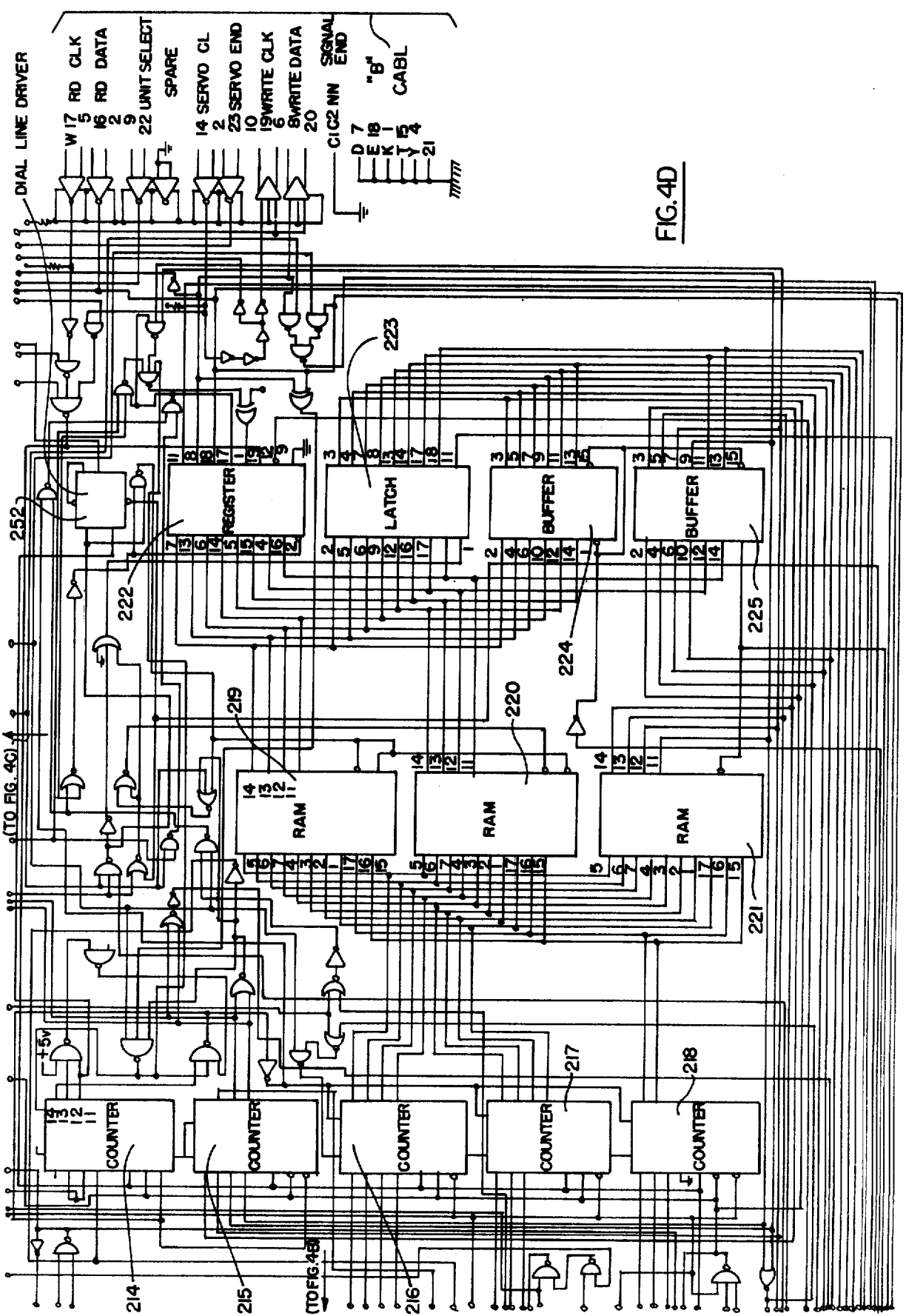

PORTABLE FIELD TEST UNIT FOR COMPUTER DATA AND PROGRAM STORAGE DISC DRIVE

BACKGROUND

Magnetic disc storage devices known as disc drives are used in conjunction with digital computers to store both data and programs. A single disc, or a stack of discs known as a disc pack, may be used. The discs of the disc pack are divided into a number of addressable cylinders of as many tracks each as there are disc surfaces in the pack, one track on the upper surface of each disc and the other on the lower surface. Either a single movable magnetic head, or a number of fixed magnetic heads, are magnetically coupled to each of the two surfaces of each disc in the disc pack to perform the reading and writing functions. The test unit of the present invention finds particular utility with disc drives of the movable head type.

There are a large number of different disc drives on the market today. Test units for each of the different types of disc drives are available. However, the objective of the present invention is to provide a portable programmable disc drive qualifier, which has universal application and which, as mentioned above, can be used to exercise and/or qualify most if not all of the better known disc drives on the market today. Specifically, the various disc drives which are presently available include 25–80 megabyte storage module drives, such as the Certainty 270 Series of Control Data Corporation, or the Ampex DM-900 Series.

The disc drive qualifier of the present invention is intended for verifying correct drive/media performance in a user environment to assure reliable data handling. It is also intended as a diagnostic tool for use in field service, and in the engineering laboratory during disc drive development. The unit may also be used for exercising disc drives under burn-in or other conditions. The low cost, high speed and extreme versatility of the disc drive qualifier of the invention makes it attractive for the foregoing and other applications. In addition, a software configured interface makes the qualifier of the invention applicable for testing other disc drives at a small software development cost.

The disc drive qualifier of the present invention is particularly adapted for use in conjunction with the storage module type of disc drive, such as those identified above. However, by software changes and cable adapters, the qualifier can be used in conjunction with other disc drives, for example, disc cartridge drives, such as the Microdata Marathon Models 7401, 7402; disc pack drives, such as the Ampex DM-9000 Series; and fixed disc drives such as the Memorex Models 550, 552, Shugart Model SA-1000, Lobo 7000 Series, and IMI 770 Series.

With the advent of the programmable disc drive qualifier of the present invention, an extremely powerful piece of test equipment is now available to the disc drive user. The qualifier makes possible the testing of disc drives and disc packs by non-technical personnel. The unit also provides the abilities to format disc packs, to flag and readdress faulty sectors, and to reduce by an order of magnitude, the time required to perform a head alignment, without the endless adjusting and lengthy error calculations normally associated with that task. Many of the other test features included in the qualifier also make it extremely useful to the trained field engineer. In fact, the qualifier of the invention is more useful than the prior art units tailored to particular disc drives. The qualifier of the invention, unlike the prior art units, can be programmed to work with all SMD (Storage Module Drive) format units and most non-SMD formats.

An important feature of the qualifier of the invention is the lack of the array of binary switches normally present in the prior art units, which are used to code entries for head number, cylinder number, address, and data information. These have been replaced with two key pads in the embodiment to be described; one for functions, the other for numeric quantities. A moderately simple test, which would be beyond the scope of the typical exerciser, can be entered easily on the qualifier. An example of this would be as follows:

[SEEK CYL] [152]
[SELECT HD] [3]
[LOAD DATA] [RANDOM]
[WRITE]
[READ]

This program would seek cylinder 152, select head number 3, generate a random data word, place the data in the write data register, write the random data in all sectors and read the data in all sectors. The operator would see, in the display windows, the write and read registers represented by two rows of LED's. The first would reflect the data in the write data register while the second would show the read back data. The operator could then depress the Error Count key and the alphanumeric display would indicate ERROR COUNT. By using the INCREMENT CYLINDER, INCREMENT HEAD, and REPEAT keys, programs can be written to check out the disc pack in its entirety, or any portion thereof. Additionally, the program can be constructed such that the test will halt at each error or will continue to the end, maintaining a cumulative error count.

Another important feature of the qualifier of the invention is the ability to call up pre-programmed diagnostic routines from PROM. An all-cylinder, all-head test with certain test algorithms may be placed in PROM to be called by entering [DIAG] [3], for example. The diagnostic routine would then run automatically and cumulative error and pass counts would be stored. This would allow a relatively low level operator to carry out extremely sophisticated test programs without being required to either understand the test or to make judgments about the test results. Should there be reason to doubt the test results, diagnostic programs for the self-test of the qualifier are also provided. By making proper use of the diagnostic programs, a user may monitor his drive units on a regular basis to determine when operating margins are being approached. The required service and adjustment may then be called for before any failures, and their resultant down-time, occurred.

One of the most tedious tasks for which a disc drive exerciser is used is to perform head alignment. The requirement for head alignment is common to all drives, and the task is made more difficult by the nature of the exercisers themselves. In SMD drives, one surface contains the servo tracks, which the servo head follows. The remaining heads are mechanically aligned to the servo head such that they are in equivalent positions on the other surfaces. To perform this alignment, in all drives, a C.E. disc pack is inserted in the drive. The C.E. pack simply makes all surfaces servo surfaces.

Each manufacturer's drive interfaces with the disc drive head alignment circuits in a different way, so usually an exerciser with head alignment capability can interface to only one type of drive. The qualifier of the invention, however, has the servo electronics in the unit itself, and is provided with cables to permit interfacing with many different types of disc drives. The available prior art units include a zero-center null meter, calibrated in micro-inches, and a reversing switch.

In the qualifier of the present invention, the reversal switching is accomplished automatically at high speed and the null signal is read by an analog-digital (A-D) converter. The A-D converter, through software, drives the read data register LED's such that all but two are lit. The dark pair indicates position off null. The operator adjusts the head so that the dark pair is in the center of the display, and reads the total, effective misalignment directly in micro-inches from the alphanumeric display. The need for calculations and judgments as to magnitude equalities is eliminated.

The qualifier of the invention also provides LED indicators for status signals from the drive, including READY, SEEK END, ON CYL, SEEK ERROR, FAULT and HIGH TEMP. Thirty test points are also available. These permit synchronization from and observation of such signals as SERVO CLOCK, SECTOR MARK, INDEX MARK, ADDRESS MARK FOUND, DATA ERROR, READ CLK, etc., as well as BUS BITS 0-10.

A random access memory (RAM) provides storage for keyboard entered programs as well as the error count and pass count registers. Because the microprocessor cannot operate in real time at normal disc data rates, a second RAM is provided. During a normal write to disc operation, for example, the microprocessor loads a sector of data into the second RAM. This data is then transferred to the disc drive in real time. When a disc pack is being formatted, the data in the second RAM remains fixed except for incrementing the address for each sector. So that no time will be lost between sectors for the microprocessor to reload this redundant data, a portion of the second RAM is accessible by the microprocessor while a write is in progress. This permits the microprocessor to increment the address while the disc is being written with the data field. In terms of formatting time, this means a complete track can be formatted for each revolution of the disc.

A fully implemented RS-232-C serial port with selectible baud rate allows simple connection of printers, cathode-ray tubes, modems or terminals. Error detection may be achieved by comparison of read data with write data, or by evaluation of an error correction code. As mentioned above, all errors, or only uncorrectible errors, can be detected and logged, as described. Disc packs written with another controller may be analyzed for error content based on evaluation with the error correcting code field. Sectors may be located by sector mark or by address mark. The entire sector may be written, or the data field and error correcting code may be written exclusively.

The qualifier of the invention has a prompting mode which provides instruction messages to the unskilled operator, and leads the unskilled operator step-by-step through procedures, such as operating the unit, testing, qualifying or formatting a disc drive, or pack, or repairing a faulty drive. The messages may, for example, direct the operator to make certain tests and, based on the results, suggest a corrective action, such as replacing a circuit board, and then directing certain other tests to realize a solution to a particular problem by following a trouble-shooting schedule. Self-test diagnostics are also included in the test unit of the invention to verify that the unit is operating correctly.

In summary, the disc drive qualifier unit of the present invention is a complete software supervised microprocessor controlled disc controller intended for test and diagnostic purposes. High speed is achieved because actual testing is done by hardware circuits in real time at disc speed. Extreme flexibility and simple programmability to perform countless variations of special test sequences is achieved by software supervision of hardware circuits. Computer control formatting and head alignment simplifies and shortens these operations.

Briefly stated, the disc drive qualifier of the present invention is an extremely versatile microprocessor controlled unit for diagnostic testing and exercising of a variety of types of storage module disc drives, and which can be easily modified for testing and exercising other disc drives.

BRIEF DESCRIPTION OF THE DRAWINGS

FIG. 1 is a perspective representation of a constructed embodiment of the disc drive qualifier and test unit of the invention;

FIG. 2 is a schematic representation of the various controls, cable connectors, indicators, and the like, on the control panel of the test unit of FIG. 1;

FIGS. 4A-4D is a logic circuit diagram of a microprocessor circuit board contained within the test unit; and FIG. 5 is a representation of a typical sector format to be stored in a conventional disc drive.

DETAILED DESCRIPTION OF THE ILLUSTRATED EMBODIMENT

Figure 3A:
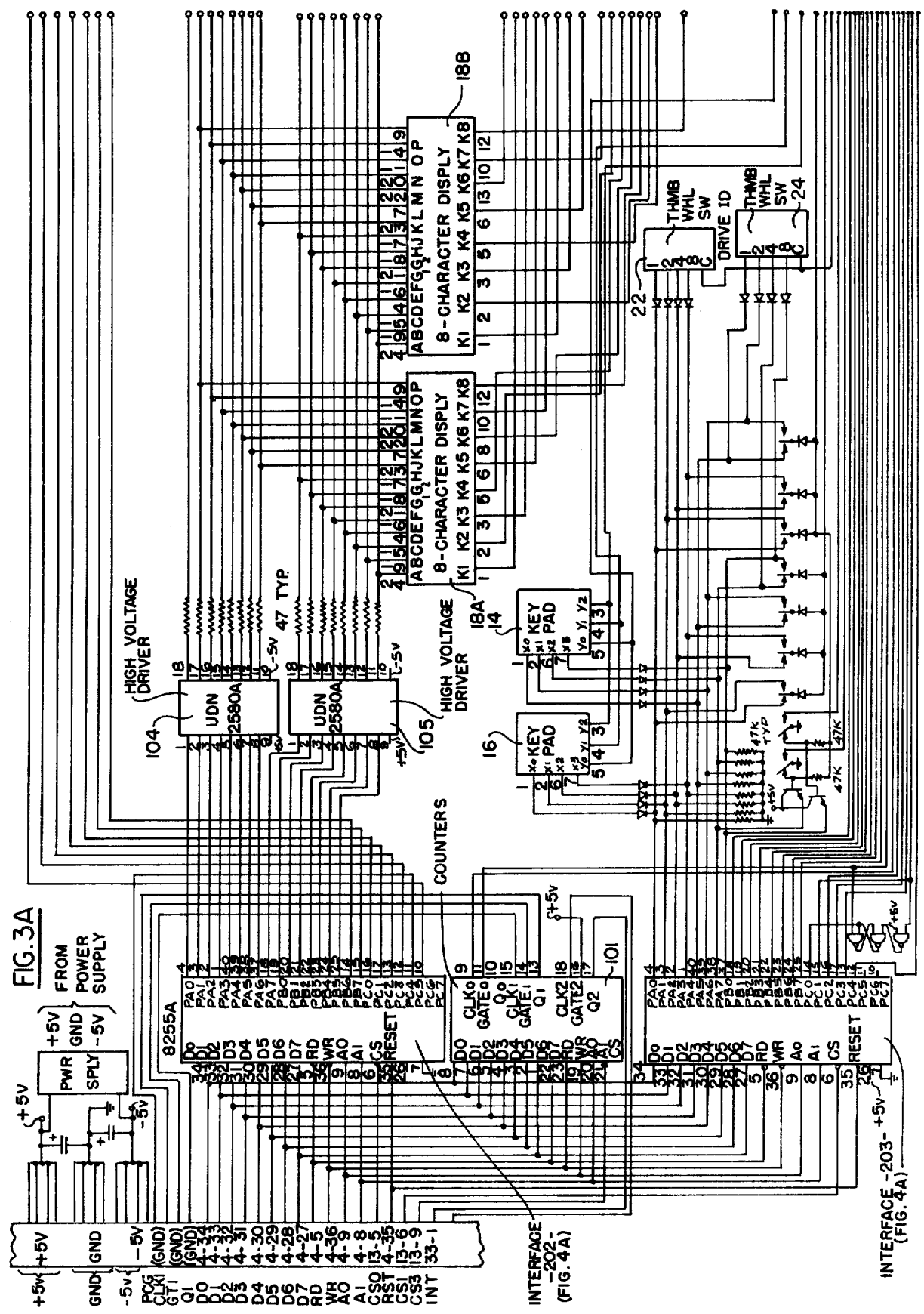
FIGS. 3A and 3B is a logic circuit diagram of a display circuit board contained within the test unit.

A disc drive qualifier unit 10 is shown in FIG. 1 which may incorporate the concepts of the invention, and it is shown as mounted in an appropriate carrying case. A constructed embodiment of the qualifier weighs about 25 pounds. The qualifier 10 includes a control panel 12 on which various controls, cable connectors, and indicators are mounted. As shown in FIG. 2, the control panel 12 includes a numeric key pad 14 which, in turn, includes twelve numeric keys designated "random", "display" and "0-9". The control panel also includes an operation key pad 16 which, in turn, includes twelve operation keys designated "SEEK CYL", "INC CYL", "DEC CYL", "SEL HD ", "INC HD", "DEC HD", "WRITE", "READ", "LOAD DATA", "REPEAT", "WRT FLAG", "RUN DIAGNOSTIC".

Also included on control panel 12 are a number of toggle switches 17A-17J designated "DRIVE - ON/OFF", "HEAD - ALIGN/NORMAL", "STROBE - PLUS/MINUS", "OFFSET - PLUS/MINUS", "ERROR - STOP/PAUSE", "PROGRAM - FORMAT", "RTZ - RST", "STOP - START", "BACKSTEP - SINGLE STEP". The front panel also includes eight indicator lights 19, 21, 23, 25, 27, 29, 31, 33 which may be of the light emitting diode (LED) type. These eight indicator lights monitor eight lines having signals set by the disc drive being tested. The indicators are designated as follows: "UNIT SEL", "RDY", "ON CYL", "HEADS LOADED", "SEEK END", "ERROR", "FAULT" and "HIGH TEMP".

Two alphanumeric displays 18A and 18B are also provided on the control panel, the displays being driven by a microprocessor within the test unit to provide a wide variety of message and test results. Sixteen LED indicators designated "WRITE" indicate the binary contents of a write data register in the unit, and sixteen LED indicators 37 designated "READ" indicate the contents of a read data register in the test unit. A power switch 20 is also included on the control panel 12. An LED indicator 20A is illuminated when the power is on.

A number of test points 39 are also provided on control panel 12, and these include "GND", "ADDRESS FIELD", "INDEX MARK", "READ GATE", "WRITE GATE", "READ ERROR", "CYL SEL", "BIT ZERO", "BIT THREE", "BIT SIX", "BIT NINE", "DATA FIELD", "SECTOR MARK", "READ DATA", "WRITE DATA", "SYNC 1", "HEAD SEL", "BIT 1", "BIT 4", "BIT 7", "BIT 10", "ECC FIELD", "ADDRESS MARK", "READ CLOCK", "WRITE CLOCK", "SYNC 2", "CNTL SEL", "BIT 2", "BIT 5", "BIT 8" and "GND".

Two cables are required to connect the test unit to the disc drive being exercised, namely, an "A", or control panel cable, which plugs into a port J2 on the control panel; and a "B", or read/write cable, which plugs into a port J3 on the control panel. In addition, several head alignment cables may be provided with different interface connectors for the different cables, and which may be plugged into a port J4. A serial input/output cable port J5 is also provided on the front panel.

Thumbwheel selector switches 22 and 24 are also provided designated "Drive I.D." and "UNIT SEL". The 117 VAC power cord for energizing the test unit plugs into a socket J1, and a fuse F1 is also provided.

To sum up, the control panel 12 includes a 12-key function key pad 16, and a 12-key numeric key pad 14. These key pads permit manual control of disc operations, one at a time or in sequence, similar to arithmetic operations on a programmable calculator. The numeric key pad 14 includes a random key which allows random cylinder searches, random write data, random head selection, and so on.

The toggle switches 17A–17J serve as function switches, and allow the selection of ±strobe, ±offset, program or format mode, single step or back step, error stop or pause, reset or return to zero, start or stop. The selector switch 24 is a thumbwheel switch which allows selection of drive; and selector switch 22 is a thumbwheel switch which calls up to sixteen stored programs for different format and drive combinations.

The eight LED's 19, 21, 23, 25, 27, 29, 31, 33 are status LED's, and these indicators display drive status as returned by the disc drive to the interface of the test unit. The thirty test points 39 appearing within the rectangle with the LED's allow oscilloscope observation of bus, interface and timing signals at the front panel.

The alphanumeric display 18 is a sixteen character display, and it displays diagnostic messages, seek time, error count, pass count, current address, track offset (head alignment), program steps (for program de-bug). The alphanumeric display 18 is driven by the microprocessor to present a wide variety of messages and test results. Status errors received from the drive are displayed automatically. Error messages generated during execution of diagnostic programs which either test the drive or self-test the unit are displayed. When the back-step-single step toggle switch is operated to the "single step" position, the display shows the current program step number and the instruction. The display will also seek time, program pass count, error count, and current address. The microprocessor will select the appropriate display, but the operator may force the display to show the most recent seek time, the current program pass count, error count, or address.

The read/write bit display achieved by the LED's contained within the same rectangle as the alphanumeric display shows actual bit-by-bit comparison of read and write data where an error has occurred.

The serial port J5 is an RS-232-C port which is available to connect the unit to a printer or a cathode-ray tube terminal. Plug-in proms can be supplied with software for driving many printers and terminals.

With respect to the operation key pad 16, the "SEEK CYL" key causes the drive to seek the cylinder specified by the following numeric entry; depressing the "INC CYL" key causes the drive to seek the cylinder address which is higher than the present address by the amount of the following numeric entry; pressing the "DEC CYL" key causes the drive to seek the cylinder address which is lower than the present address by the amount of the following numeric entry; pressing the "SEL HD" key causes the drive to select the head specified by the following numeric entry; and depressing the "INC HD" key causes the drive to select the head which is higher than the present head by the amount of the following numeric entry.

Depressing the "DEC HD" key causes the drive to select the head which is lower than the present head by the amount of the following numeric entry; depressing the "WRITE" key causes the contents of the write data register to be written in each sector of the track presently addressed; depressing the "READ" key causes the drive to read each sector of the track presently addressed (the read data and the error correcting code are checked, and errors are logged according to error switch settings); depressing the "LOAD DATA" key causes the write data register to be loaded with a binary number as specified in octal by the following numeric entry; depressing the "REPEAT" key causes the program to return to the program step which follows the seek or select instruction before the increment or decrement instruction which precedes the repeat.

For example, when a repeat instruction is encountered, the microprocessor will look backward in the program to the next previous increment or decrement instruction and determine whether it was a cylinder or a head instruction, then look further back to the next previous seek cylinder or select head instruction, and go on to the following program step, if the following numeric entry has not been exceeded, or ignore the repeat if it has. A repeat instruction follows an increment or decrement instruction, although not necessarily directly, and it sends the program back to just after the initial setting of the incremented or decremented quantity, until the quantity finally equals the value specified in the repeat instruction, and then the program proceeds beyond the repeat.

Depressing the "WRT FLAG" key causes a Defective Track Flag to be written in bit 6 of address word 1 of the track which is selected at the time the "SINGLE STEP" button is depressed (WRT FLAG will not operate in any continuous mode); depressing the "RUN DIAGNOSTIC" key causes the diagnostic program already stored in the read-only memory, which is specified by the following numeric entry to be run.

The numeric keys 0-9 of key pad 14 are used for numeric data entry. The "random" key may be used at any time in place of numeric entry, and will cause a random number with the proper bounds to be entered.

The RTZ-RST toggle switch 17E causes the drive to seek cylinder zero and select head zero, and clears the drive fault register contained within the drive. The backstep-single step toggle switch steps the program one-by-one, but does not execute, and is used for program editing. The alphanumeric display 18 displays program information when the backstep-single step switch is pressed. The drive toggle switch 17A sequences power to the drive, and selects the drive and format. The strobe toggle switch 17C sets strobe plus or minus or nominal. The offset toggle switch 17D sets track offset plus or minus or nominal. The error toggle switch 17E causes the program to stop on uncorrectible errors, or to ignore errors, or to pause and display the error and then proceed.

The program-format toggle switch 17F, when set to "program" enables the creation of a program, and when set to "format" allows the unit to write the format specified by the drive ID selector switch 22 onto each track of the disc drive. The operation is automatic. The operator presses the switch down and then back up. The drive will then return to zero and proceed to write format sequentially on each track of each cylinder. If an error occurs, the formatting program will stop and identify the error so that the operator can take whatever corrective action is indicated.

When the stop-start toggle switch 17H is moved to the up position, in the program mode, a halt is written into the program, so that programs may be created which stop upon completion, as well as ones which continuously recycle. In the run mode, this switch enables manual stop of programs. When the switch is set to its "start" position, it starts keyboard created programs.

When the head alignment-normal switch 17B is moved to its upper position, it puts the unit in the head alignment mode. When the switch is set to its "normal" position, the unit is placed in the proper mode to test drives. The alphanumeric display 18 displays entry data or microprocessor generated messages. When the "DISPLAY" key of key pad 14 is pressed, it must be followed by pressing the desired display mode button, and the display will then be in that mode. The LED's 35 designated "WRITE" and the LED's 37 designated "READ", as mentioned above, indicate the binary contents of the write data register and of the read data register, respectively.

The eight LED status indicators 19, 21, 23, 25, 27, 29, 31, 33, as mentioned above, monitor eight lines having signals sent to the unit by the drive. The status LED's will all be illuminated when DIAGNOSTIC zero is called. The status indicators are as follows: "UNIT SELECTED"—shows that the drive is selected; "READY"—shows when the drive is ready for seek and write or read operation; "ON CYLINDER"—this indicator is off during a seek operation; "SEEK END-"—this indicator is off during a seek action; "SEEK ERROR"—shows failure to seek addressed cylinder; "FAULT"—shows when any of several unsafe conditions occur in the drive; "HEADS LOADED"—shows when the heads are loaded; "HIGH TEMP"—shows over-temperature condition in the drive.

The test points 39 operate as follows: The READ ERROR test point goes to logical zero when a data error occurs; the SECTOR MARK test point goes to a logical zero when the unit receives a Sector Mark signal from the drive under test; the INDEX MARK test point goes to logical zero when the unit receives an Index Mark signal from the drive under test; the ON CYL test point goes to logical zero when the drive under test is On Cylinder; the ADDRESS MARK test point goes to logical zero when the unit receives an Address Mark Found signal from the drive under test; and the READ DATA test point reflects the binary value of the serial data bits being received from the drive under test during a read operation.

The READ CLOCK test point reflects the logical level of the 9.667 MHz read clock signal received from the drive under test during a read operation; the WRITE DATA test point reflects the binary value of the serial data bits being processed by the unit during a write operation; the WRITE CLOCK test point reflects the logic level of the 9.667 MHz write clock signal that the unit sends to the drive under test during a write operation; the CYL SELECT test point goes to a logical zero when the unit sends a Cylinder Select signal (TAG1) to the drive; and the HEAD SELECT test point goes to a logical zero when the unit sends a Head Select signal (TAG2) to the drive.

The CONTROL SELECT test point goes to a logical zero when the unit sends a Control Select signal (TAG3) to the drive; the ADDR. FIELD test point goes to a logical zero with the first bit of the address field and remains at logical zero until the end of the address field; the DATA FIELD test point goes to logical zero with the first bit of the data field and remains at logical zero until the end of the data field; the ECC field test point goes to logical zero with the first bit of the error correction code field, and it remains at logical zero until the end of the error correction code field; and the SERVO CLOCK test point reflects the logic level of the Servo Clock generated by the drive.

The READ GATE test point is at logical zero to indicate the presence of a Read Gate signal generated by the unit during any read operation; the WRITE GATE test point is at logical zero during the presence of a Write Gate signal generated by the unit during any write operation; the GND test points are a common ground point between the logic board of the unit and the control panel; and the BITS zero through ten test points are eleven test points which reflect the logical value of the Bus Out Lines delivered to the drive under test by way of the A-cable.

The particular embodiment of the unit under consideration has four operating modes. These are designated "Single Operation Mode"; "Program Mode"; "Diagnostic Mode" and "Head Alignment Mode".

In the Single Operation Mode, the operator presses one key of operation key pad 16 and makes a numeric entry on key pad 14. Pressing the next key on operation key pad 16 executes the operation. For example, [SEEK CYL][152][NEXT OPERATOR]. The machine then executes the instruction.

In the Program Mode, the operator sets the program switch to PROGRAM and then enters a series of instructions to be followed, including branch instructions as described under the operation key definitions. The operator then moves the PROGRAM switch to neutral and activates the START switch. The machine executes all the instructions sequentially as entered. A simple program as referred to above might be:
[SEEK CYL] [152]
[SELECT HD] [3]
[LOAD DATA] [RANDOM]
[WRITE]
]READ]
[INC CYL] [2]
[REPEAT] [158]
[STOP]

This program would seek cylinder 152, select 3, put random data in the write data register, write the random data in all sectors, read the data from all sectors, increment the cylinder by 2 (that is, seek cylinder 154), repeat the same write and read operations on the same head, increment the cylinder by 2 again, repeat the same write and read operations on head 3 of cylinder 156, and then stop.

In the Diagnostic Mode the operator presses the RUN DIAGNOSTIC key of key pad 16 followed by a numeric entry on key pad 14 which identifies the pre-written program desired. The machine then follows a program stored in its read-only memory (ROM) which is designed to test the entire drive and verify suitability of the drive for service. Error and status messages are displayed on the alphanumeric display 18. Diagnostic programs are also provided for self-test of the unit itself, as mentioned above.

In the Head Alignment Mode, the unit is first connected to the drive in normal manner with the A and B cables connected to the J2 and J3 connectors respectively. In addition, a head alignment cable is connected from the head alignment connector on the unit to the appropriate receptacle on the drive. Several different cables are supplied to permit connection to various different drives. For this mode, the operator sets the exerciser head alignment switch up; up-rates the read key on key pad 16, places the appropriate disc pack on the drive, and proceeds to align the heads according to the procedure established for the particular drive. The bit display acts as a null meter during head alignment. Ranging is automatic, and the error in micro inches is displayed on the alphanumeric display 18.

Figure 3B:
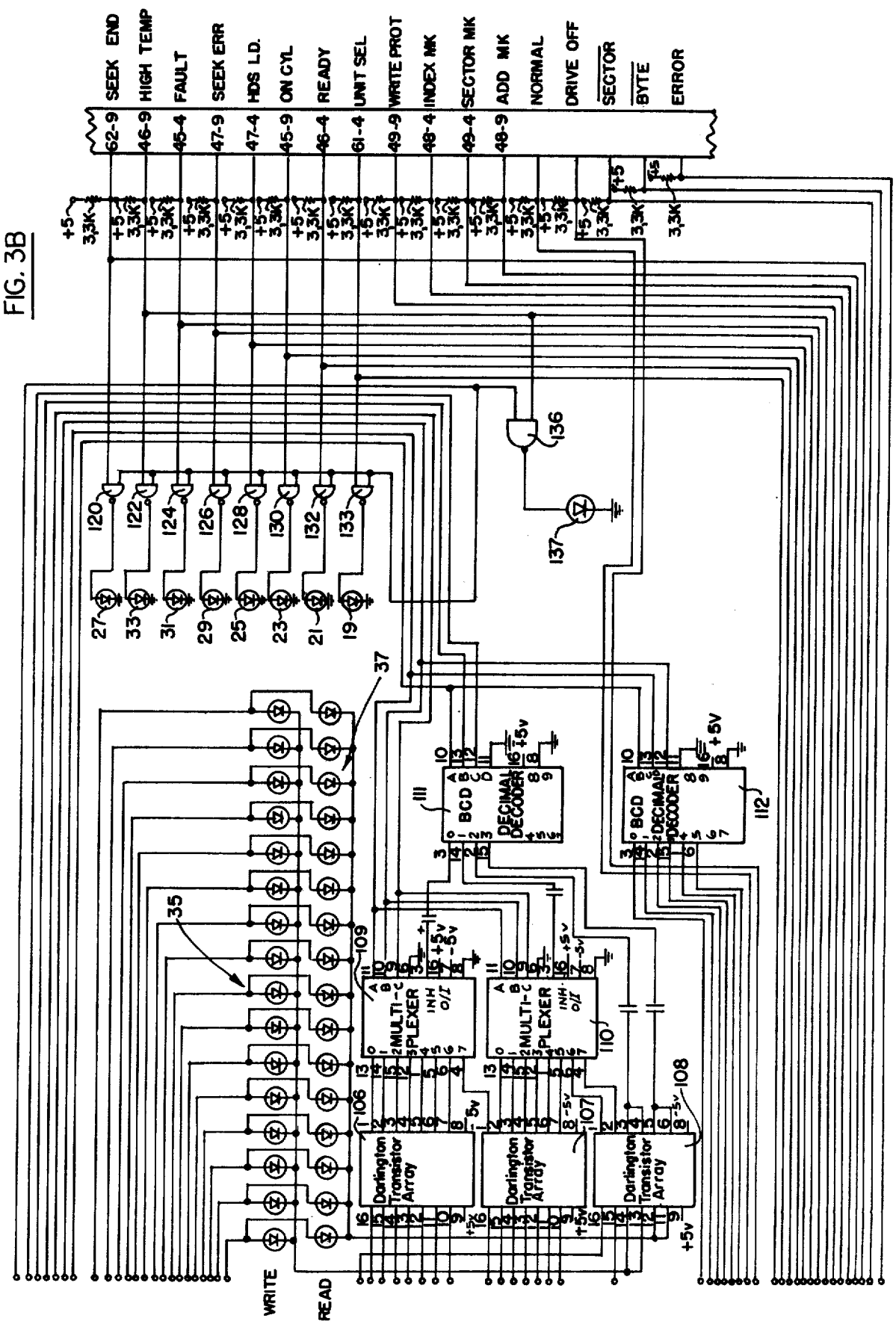

The logic circuitry for the display circuit board is set out in FIGS. 3A and 3B. A pair of programmable peripheral interface circuits 202 and 203 which may be integrated circuits of the type designated 8255A, are illustrated in FIG. 3A, although these circuits are actually contained in the microprocessor circuitry of FIG. 4A. A number of counters contained in an integrated circuit chip 101 are contained in the display circuit. This latter chip may be of the type designated 8253.

The programmable interface circuit 202 is connected to a pair of high voltage drivers 104, 105 which are integrated circuits of the type designated UDN2580. The drivers drive the displays 18A and 18B, each of which is an 8-character display of the type designated MAN2815. The drivers also drive the LED's 35 and 37 of FIG. 3B.

The programmable peripheral interface circuit 203 is connected to the toggle switches 17A–17J, to the key pads 14 and 16, and to the thumbwheel selector switches 22 and 24, as shown in FIG. 3A. The key pads 14 and 16 may be of the type designated M1209-0.

As shown in FIG. 3B, a number of signals derived from the disc drive being exercised are applied through a series of "nand" gates 120, 122, 124, 126, 128, 130, 132 and 134 to the LED's 27, 33, 31, 29, 25, 23, 21 and 19 of FIG. 2. The "Write Protect" signal is applied through a "nand" gate 136 to an LED 137 which is designated a "write protect" indicator.

The displays 18A and 18B are controlled by three-Darlington transistor arrays 106, 107 and 108, each of which is an integrated circuit of the type designated ULN2011A. The transistor arrays, in turn, are controlled by multiplexers 109 and 110, which are integrated circuits of the type designated CD4051BE, and by BCD-decimal decoders 111 and 102 which are integrated circuits of the type designated CD4028BE.

Figure 4A:
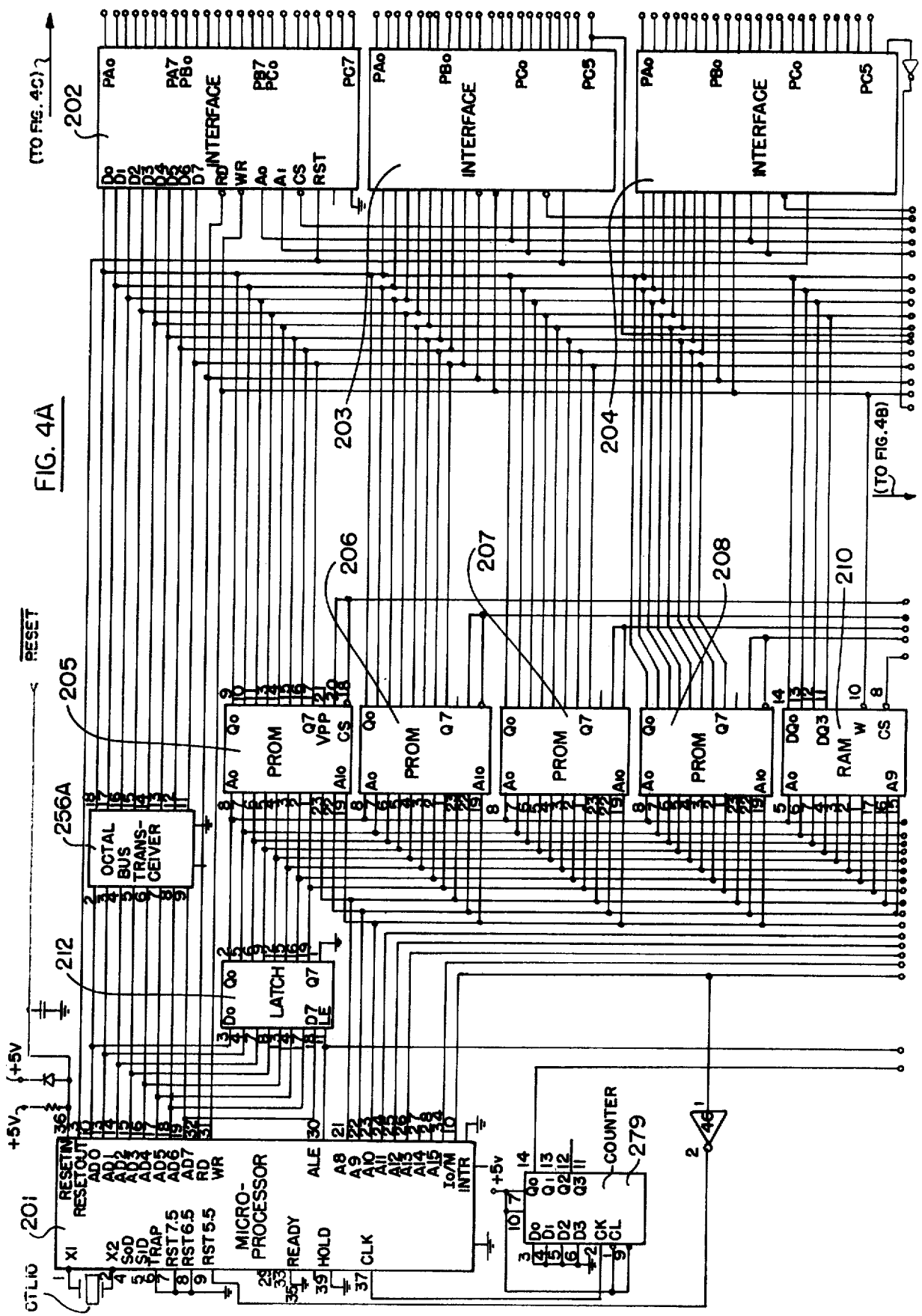

The interface circuits 202 and 203, as noted above, are actually located on the microprocessor circuit board of FIG. 4A. These interface circuits are programmable input/output ports. Each circuit consists of three groups of eight flip-flops. The first group responds to data (D0–D7) from the microprocessor to act as an output port; the second group responds to data from the display circuit of FIGS. 3A and 3B to function as an input port; while the third group responds to a control word from the microprocessor received on the data/address bus (D0–D7) to determine whether the interface circuit is to be conditioned as an input or output port. The various groups of flip-flops are addressed by the address signals A0, A1 received over the data/address port. In the particular system of FIG. 3A, interface 202 always functions as an output port for the microprocessor, whereas interface 203 always functions as an input port.

Integrated circuit chip 101 contains three counters which are likewise addressed by the A0, A1 bits on the data/address bus. The first counter sectors on the disc drive being exercised by the unit of the invention. This counter is set at the index position of the disc, and it is clocked for each sector. The microprocessor can look at the state of the counter at any time to determine which sector of the disc is then available.

The second counter functions as a divider to count down from the microprocessor's crystal clock to generate the BAUD rate for the RS-232-C serial port. The third counter runs asynchronously at high frequency and generates random numbers. These random numbers are read by the microprocessor when the random key of key pad 14 (FIG. 2) is operated.

Figure 4B:
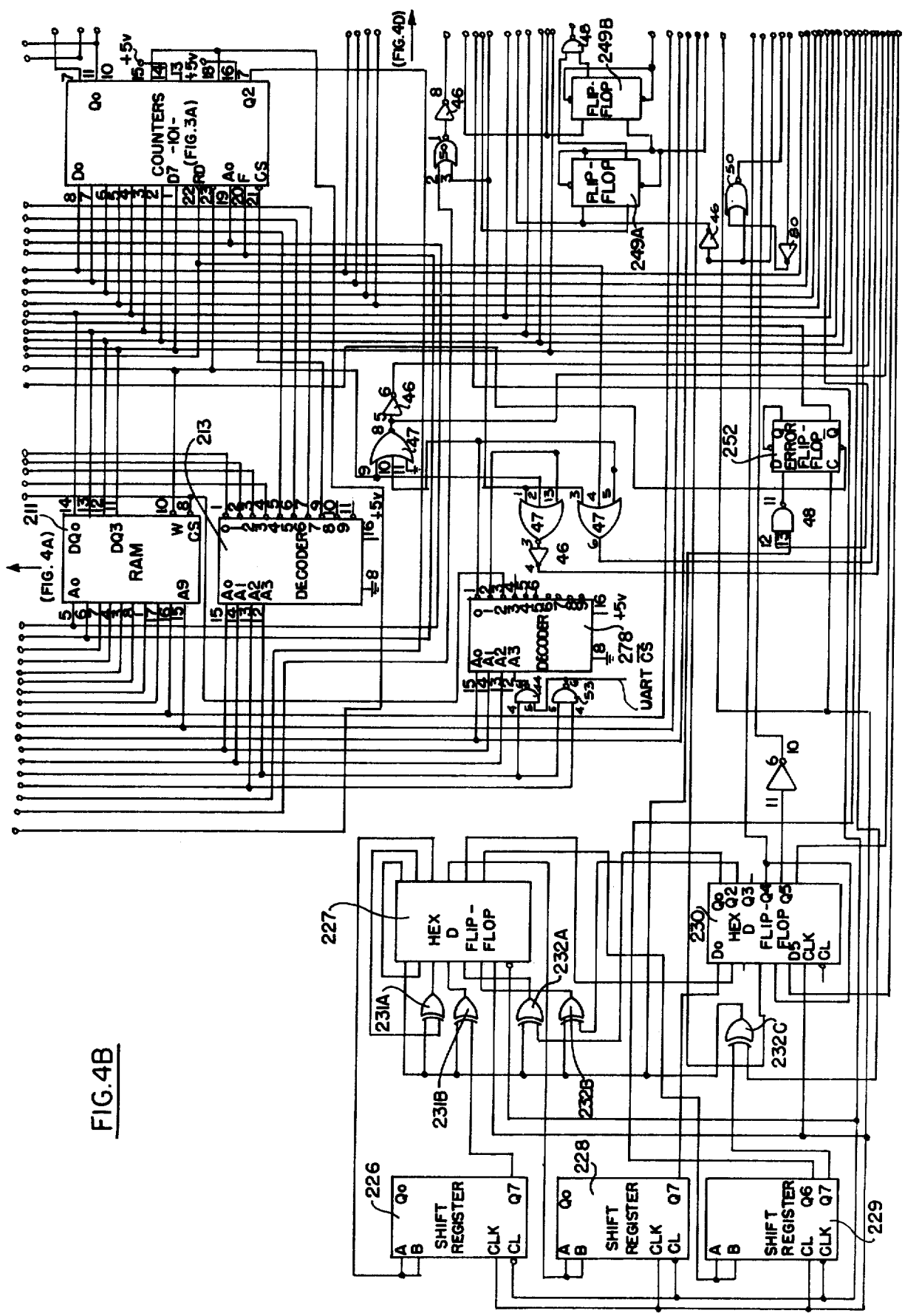
Figure 4C:
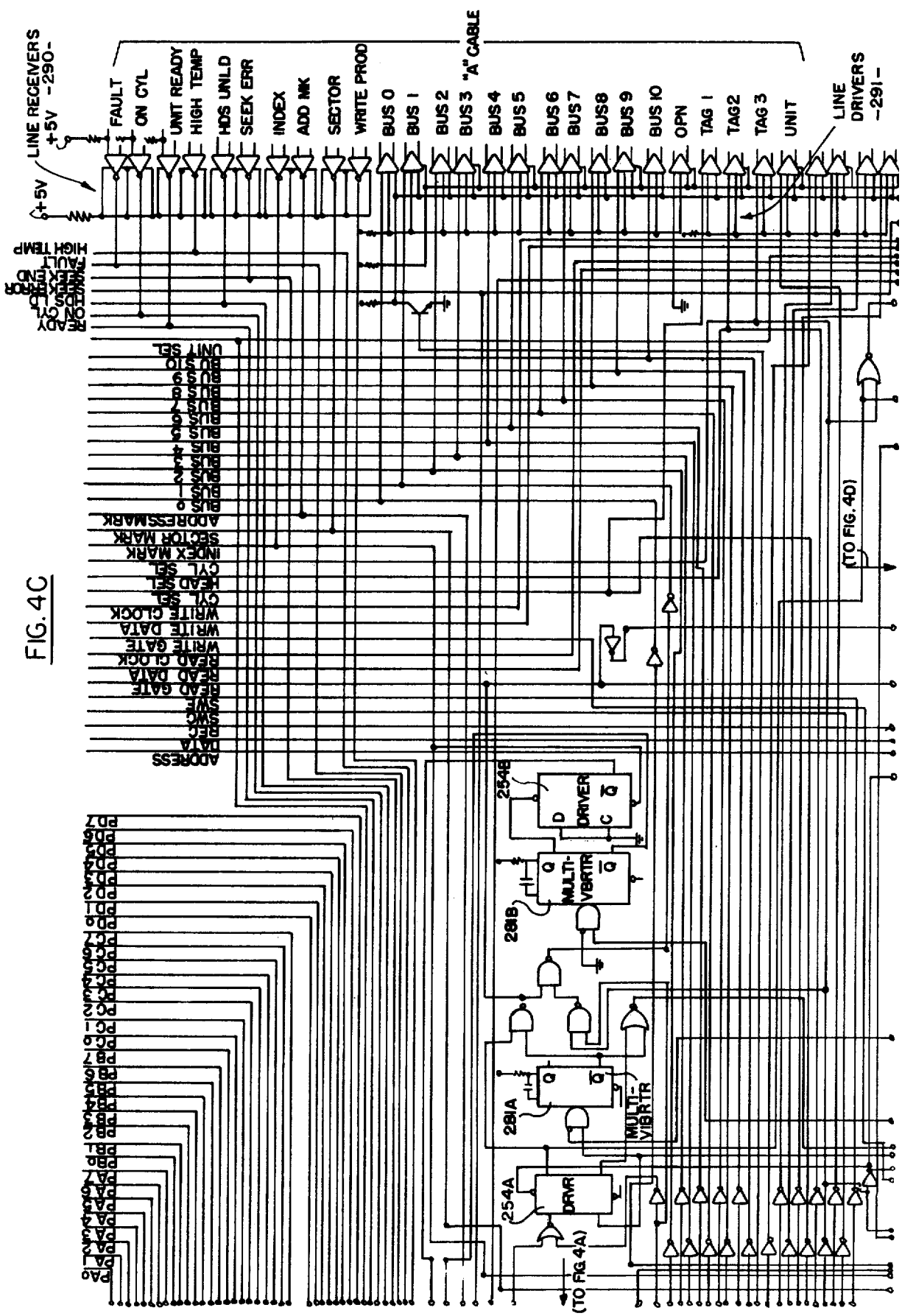

The inputs received on the right-hand side of the circuit of FIG. 3B are derived from line receivers 290 in FIG. 4C which, in turn, are received from the disc drive being exercised through cable A by way of port 52 (FIG. 2). These inputs, as mentioned above, are fed to the LED's 19–13 to provide appropriate indications on the front panel (FIG. 2). The inputs are also applied to the interface circuit 203 of FIG. 3A so that they may be sensed by the microprocessor.

The logic circuitry for the microprocessor board within the test unit, as mentioned above, is shown in FIGS. 4A, 4B, 4C and 4D. FIG. 4A represents the upper left-hand portion of the circuit, FIG. 4B represents the lower left-hand portion of the circuit, FIG. 4C represents the upper right-hand portion of the circuit, and FIG. 4D represents the lower right-hand portion of the circuit.

The circuit of FIG. 4A includes a microprocessor 201 which may be of the type designated 8085. Clock signals for the microprocessor are provided by a counter 279 which is a synchronous resettable binary counter of the type designated 74LS161. The microprocessor is also connected to a crystal CTL10. The program for the microprocessor is stored in four programmable readonly memories (PROMS) 205, 206, 207, 208. These memories may have a capacity of 2K × 8, and may be of the type designated 2716. The microprocessor also has two random access memories 210 and 211 (FIG. 4B) connected to it, each of which may be of the type designated 2114, and each may have a capacity of 1K × 4.

Also included in the circuit of FIG. 4A is an octal bus transceiver 256A which may be of the type designated 74LS245, and a latch 212 which is an octal transparent latch of the type designated 74LS373.

The inputs to and outputs from the microprocessor to and from the portion of the circuit shown as FIG. 4C pass through three programmable peripheral interface circuits 202, 203 and 240, each of which is an integrated circuit of the type designated 8255A. The circuits 202 and 203 have been referred to previously in conjunction with FIG. 3A.

The microprocessor address and data signals (AD-0–AD7) are time multiplexed on a single bus in the circuit of FIG. 4A and are passed through a two-way buffer provided by the octal bus transceiver 256A. Latch 212 serves to separate out the address signals from the data signals, and applies the address signals (A0–A7) to the PROM's 205-208, and to the RAM 210, as well as to the RAM 211 of FIG. 4B. The program for the microprocessor is stored in the PROM's. Data is written into the addressed locations of the RAM's, or is read out of the addressed locations of the RAM's, depending upon whether the control signal W is true or false. The memories are connected to the programmable peripheral interfaces 202, 203 discussed above, and to the third programmable peripheral interface 204. As described above, these interfaces are capable of operating as two-way ports.

The portion of the microprocessor circuit board shown in FIG. 4B includes three shift registers 226, 228 and 229 which are serial-in-parallel out shift registers of the type designated 74LS164. The circuitry also includes two hex D flip-flops 227 and 230, each of which is of the type designated 74LS174. Also included in the circuit of FIG. 4B are two decoders 213 and 278, which are BCD-decimal decoders of the type designated 74LS42. The circuit also includes the counters of integrated circuit chip 101 described above, which is actually located in the display circuit of FIG. 3A.

Two flip-flops 249A and 249B are included in the circuit, which are of the type designated 75107. Also included in the circuit is a flip-flop 252 of the type designated 75110.

The circuit of FIG. 4A also includes a number of exclusive "or" gates designated 231A, 231B, 232A, 232B and 232C. These are quad two-input exclusive "or" gates of the type designated 74LS86. Also included in the circuit of FIG. 4A are three triple input "nor" gates designated 247A, 247A and 247C, which may be of the type designated 74LS27. Additional inverters, "nor" gates and "nand" gates are also included in the circuit of FIG. 4A, as shown.

The shift registers 226, 228 and 229 and the flip-flops 227 and 230 form an error correcting code generator (ECC). As shown in FIG. 5, each sector format of the disc drive being exercised includes an "ECC" field appended to the end of the data field, and which indicates whether the data field is correct. The ECC field is created by causing the data field to be shifted through the shift registers 226, 228 and 229 which are wired such that after the entire data field has been shifted through the register, a particular code remains in the register for the particular data in that field. During a Write operation, the ECC is appended at the end of the data field written into the designated sector of the selected disc. During a Read operation, the ECC obtained as the data field is shifted through the registers is compared with the ECC field as read from the disc. If there is an error, flip-flop 252 is set, and the error is indicated by LED27 on the front panel (FIG. 2).

The decoders 213 and 278 decode memory select address signals from the microprocessor to select the PROM's 205, 206, 207 and 208 of FIG. 4A, and the RAM 210 of FIG. 4A and RAM 211 of FIG. 4B for subsequent addressing.

The flip-flops 249 A and 249 B respond to the mechanical synchronizing sector mark from the disc drive being exercised, and these flip-flops serve to resynchronize the mark with the actual start of data in the qualifier. Both flip-flops generate a sector marking signal which is shifted to correspond with the actual start of data in the system.

The circuity of FIG. 4C includes a pair of dual line drivers 254A and 254B, each of which may be of the type designated 75110. The circuitry also includes a pair of dual retriggerable resettable multivibrators (one-shots) 281A and 281B, each of which may be of the type designated 74123. The circuit of FIG. 4C also includes a series of line receivers 290 which receives signals from the disc drive being exercised over the A cable, by way of the port J2. Also, the circuit of FIG. 4C includes a number of line drivers 291 which output address and data signals, and control signals to the disc drive being exercised through the port J2, and by way of the A cable. The circuit of FIG. 4C also includes a number of inverters, "nand" gates, "nor" gates, and transistors, as shown.

The one-shots 281A and 281A in FIG. 4C serve to stretch the 1.25 microsecond sector pulses from the disc drive, and the 2.5 microsecond index pulses, so that these pulses can have sufficient width to be scanned by the microprocessor.

The various signals carried from the disc drive by the A cable are pressed through the line receivers 290 to the various test points 39 (FIG. 2). Also, the various data and address signals to be fed to the disc drive by the A cable are fed to the A cable through the line drivers 291, as mentioned above. The lines designated BUS-0–BUS10 carry address and data signals to the cylinders and heads of the disc drive, and also control signals to designate the selection of the cylinders and heads, and also to differentiate between address and data signals. The TAG1 control signal causes the cylinders to be addressed; the TAG2 control signal causes the heads to be addressed; and the TAG signal causes the controls to be addressed.

The circuit of FIG. 4D includes four synchronous presettable binary counters 214, 215, 216, 217 and 218, each of which may be of the type designated 74LS161. Also included in the circuit are random access memories 219, 220 and 221 each of which has a capacity of 1K × 4, and which may be of the type designated 2114. The circuit includes a pair of hexagonal three-state buffers 224 and 225, which may be of the type designated 74LS367, and an 8-input universal shift/storage register 222 which may be of the type designated 74LS299. Also included in the circuit is a dual line driver 252 which may be of the type designated 75110. As shown, a number of "nand" gates, 37 nor" gates, exclusive "or" gates, and other standard logic elements are also included in the circuit.

The counters 214–218 in FIG. 4D are set by the synchronizing signals from flip-flops 249A and 249B of FIG. 4B at the beginning of each sector of the disc drive being exercised, and they count out each position within each sector. Counter 214 counts bits, and outputs every eight bits to designate a byte count. Counter 215 is used as a register. Counters 216, 217 and 218 count bytes and provide byte positions within the sector.

The RAM's 219, 220 and 221 are addressed by the counters 216, 217 and 218 for each byte position within the sector to read or write data from or into the addressed disc of the disc drive. RAM 221 stores a code which indicates the function for each byte of the sector. This is an important feature in that appropriate software can condition the RAM 221 to a different sector format for the various disc drives so as to provide flexibility to the system. A typical sector format is shown in FIG. 5, but this format can be changed by appropriate software control of RAM 221.

When particular data is to be written into the selected sector, it is usual that the portions of the sector, other than the actual data field, will remain unchanged, and the code in RAM 221 can also be used to turn on the write amplifier during a write operation at the beginning of the data field. As discussed, this operation can be software controlled.

During the write operation the address changes for each sector. In order to obviate the need to reload RAM's 219 and 220 with a new address for each subsequent sector, latch 223 is used to provide the sector address of the format of FIG. 5. All other fields, however, are obtained from the RAM's 219 and 220, and the format RAM 221 identifies the position of each field in the word of FIG. 5.

The latch 223 is set with a new address after each read or write operation, this setting being achieved by the microprocessor.

Counter 215 re-clocks data out of the format RAM 221. This counter, as stated, serves as a register and stores the output from the format RAM 221 for one byte time during each write or read operation. All information stored in the RAM's 219 and 220 is tored one byte time ahead of the information on the disc to allow for settling time of the circuitry, and register 221 brings the format information into synchronization with the disc information.

Register 222 is a parallel-to-serial register, and it serves to write information serially into the disc, and to read information serially from the disc.

Buffers 224 and 225 are tri-state buffers which serve to load the RAM's 219 and 210 from the microprocessor and to unload the RAM's into the microprocessor. These buffers can be set to an off stte to disconnect the RAM's from the microprocessor when the RAM's are transferring information to or from the disc drive.

Flip-flop 252 is a flip-flop which tells the microprocessor when the address information in the latch 223 has been used to address the disc, and that the latch is available for the next address.

The invention provides, therefore, a universal disc drive qualifier which is capable of exercising a wide variety of disc drives, theunit being subject to software control to exhibit a wide range of flexibility.

While a particular embodiment of the invention has been shown and described, modifications may be made, and it is intended in the claims to cover the modifications which come within the spirit and scope of the invention.

What is claimed is:

1. A programmable test unit for qualifying a disc drive comprising: programmable format memory means for storing different sector format programs for different disc drives; address circuitry connected to said format memory mean for selecting different formats from said format memory means and following the byte count of each disc sector in real time of the disc drive being qualified; and output circuitry connected to said format memory means for establishing the sector format of the disc drive being qualified.

2. The programmable test unit defined in claim 1, and which includes a housing; a control panel mounted on said housing; a first key pad mounted on said control panel including a plurality of operation keys; a second key pad mounted on said control panel including a plurality of numeric keys; and microprocessor control circuitry connected to said first and second key pads and to said format memory means for causing said format memory means to generate different formats as the operation keys and numeric keys are manually operated.

3. The programmable test unit defined in claim 2, and which includes a plurality of indicator lights mounted on said control panel for monitoring the disc drive being qualified, and circuitry connecting said indicator lights to said microprocessor controlled circuitry.

4. The programmable test unit defined in claim 2, and which includes a plurality of manually operated switches mounted on said control panel for selecting different formats from said format memory means, and circuitry connecting said switches to said microprocessor controlled circuitry.

5. The programmable test unit defined in claim 2, and which includes a plurality of test points mounted on the control panel to indicate selected test conditions of the disc drive being qualified, and circuitry connecting said test points to said microprocessor controlled circuitry.

6. The programmable test unit defined in claim 2, and which includes alphanumeric display means mounted on the control panel to provide message and test results; and circuitry connecting said display means to said microprocessor controlled circuitry.

7. The programmable test unit defined in claim 2, and which includes circuitry connected to said microprocessor control circuitry to cause said test unit to perform a head alignment function for the disc drive being qualified without manual reversing and averaging.

8. The programmable test unit defined in claim 1, in which said last-named circuitry includes write and read data register means, circuitry connecting said register means to said microprocessor controlled circuitry, and a plurality of indicator lights mounted on said control panel connected to said register means for indicating the contents of said register means.

9. The programmable test unit defined in claim 1, in which said last-named circuitry includes read/write data memory means connected to said format memory means and operating in synchronism therewith to transfer the sector format data to the disc drive being qualified in real time, and to receive and store data from the disc drive in real time.

10. The programmable test unit defined in claim 9, in which said last-named circuitry includes a latch circuit means for storing a portion of the sector format data to be written into the disc drive being qualified, and circuitry connected to said last-named circuitry for replacing said format memory means by said latch circuit means at certain times under the control to said format memory means.

* * * * *